United States Patent [19]
Lawther et al.

[11] Patent Number: 5,761,551
[45] Date of Patent: Jun. 2, 1998

[54] COMPACT CAMERA WITH MULTI-LAMP FLASH WHEEL ROTATABLE ABOUT FILM CHAMBER

[75] Inventors: Joel S. Lawther, East Rochester, N.Y.; Ralph M. Lyon, Marshfield, Wis.

[73] Assignee: Eastman Kodak Company, Rochester, N.Y.

[21] Appl. No.: 802,175

[22] Filed: Feb. 14, 1997

[51] Int. Cl.[6] ............... G03B 15/04; F21K 5/00
[52] U.S. Cl. ............... 396/191; 396/192; 362/14; 431/359
[58] Field of Search .................. 396/191, 192, 396/193, 197; 362/11, 13, 14, 15; 431/359, 362, 365

[56] References Cited

U.S. PATENT DOCUMENTS

| | | |
|---|---|---|
| 2,892,073 | 6/1959 | Michatek et al. ............... 396/197 |
| 3,309,513 | 3/1967 | Aymar ............... 362/13 |
| 3,452,660 | 7/1969 | Schultz et al. ............... 396/197 |
| 3,491,665 | 1/1970 | Fischer ............... 396/192 |
| 3,866,033 | 2/1975 | Stacy et al. ............... 396/191 |
| 3,919,539 | 11/1975 | Winkler et al. ............... 362/14 |
| 4,098,565 | 7/1978 | Van de Weijer ............... 431/93 |
| 4,265,527 | 5/1981 | Engelsmann et al. ............... 396/197 |
| 4,298,908 | 11/1981 | English et al. ............... 362/14 |
| 4,347,053 | 8/1982 | Fohl et al. ............... 431/359 |
| 5,319,404 | 6/1994 | Swayze ............... 354/149.11 |
| 5,406,343 | 4/1995 | Stephenson ............... 354/149.1 |
| 5,649,242 | 7/1997 | O'Brien et al. ............... 396/191 |

*Primary Examiner*—A. A. Mathews
*Attorney, Agent, or Firm*—Roger A. Fields

[57] ABSTRACT

A camera comprising a main body part having a film chamber, and a multi-lamp flash wheel supported for rotation to move successive flash lamps from a storage to a use position for illuminating a subject to be photographed. The multi-lamp flash wheel is rotatable about the film chamber to make the camera relatively compact.

7 Claims, 6 Drawing Sheets

5,761,551

COMPACT CAMERA WITH MULTI-LAMP FLASH WHEEL ROTATABLE ABOUT FILM CHAMBER

CROSS-REFERENCE TO RELATED APPLICATIONS

Reference is made to commonly assigned copending applications Ser. No. 08/674,220, entitled CAMERA WITH MULTI-LAMP FLASH WHEEL and filed Jun. 28, 1996 in the names of Joel S. Lawther and Ralph M. Lyon, and Ser. No. 08/672,604, entitled CAMERA WITH COMBINATION MULTI-LAMP FLASH SOURCE AND EXPOSURE COUNTER and filed Jun. 28, 1996 in the names of Joel S. Lawther and Ralph M. Lyon.

FIELD OF THE INVENTION

The invention relates generally to the field of photography, and in particular to a camera to be used with a multi-lamp flash wheel.

BACKGROUND OF THE INVENTION

Manufacturers often look for ways to make a camera relatively compact and inexpensive.

It is known for a camera to be used with an inexpensive, replaceable, multi-lamp flash wheel instead of a more expensive, built-in, electronic flash. For example, prior art U.S. Pat. No. 4,098,565 issued Jul. 4, 1978 discloses a multi-lamp flash wheel in which the flash lamps are arranged radially in a fan-like circular array with respective ignition ends of the lamps being relatively close to one another and respective opposite ends of the lamps being relatively far from one another. The circular array of flash lamps is rotated inside the camera to advance the lamps successively into a slot-like recess at the front of the camera, to use the lamps. Each one of the lamps is positioned in the recess with its opposite end protruding radially from the recess towards a subject to be photographed. A fixed, faceted, reflector at opposite sides of the recess reflects flash illumination substantially radially from the lamp in the recess. A percussion spring is located to strike an ignition stem or ferrule of the lamp in the recess to ignite the lamp. This design, though inexpensive, makes the camera less than compact.

THE CROSS-REFERENCED APPLICATIONS

Cross-referenced Ser. No. 08/674,220 discloses a camera comprising an optical viewfinder with a pair of aligned front and rear lenses for viewing a subject to be photographed, and a multi-lamp flash wheel rotatable to move respective one-time-use flash lamps to a use position for illuminating the subject. The multi-lamp flash wheel has a lamp cover wheel which is transparent to transmit the illumination from each of the flash lamps in the use position, and the front lens is an integral centered portion of the lamp cover wheel.

Cross-referenced Ser. No. 08/672,604 discloses a camera comprising a light sensitive film on which a certain number of exposures can be made, and a multi-lamp flash source having a plurality of one-time-use flash lamps equal in number to the total number of exposures to be made on the film. The multi-lamp flash source has consecutive indicators proximate the respective lamps for indicating the number of exposures available to be made and is supported for movement to move the respective lamps from a storage to a use position for illuminating a subject to be photographed and, substantially simultaneously, to move the respective indicators from a concealed to a visible position.

SUMMARY OF THE INVENTION

According to one aspect of the invention a camera comprising a main body part having a film chamber, and means for supporting a multi-lamp flash wheel for rotation to move successive flash lamps from a storage to a use position for illuminating a subject to be photographed, is characterized in that:

the means supports the multi-lamp flash wheel for rotation about the film chamber to make the camera relatively compact.

According to another of the invention a multi-lamp flash wheel comprising a circular array of flash lamps having respective ignition ends and respective opposite ends, is characterized in that:

the flash lamps are located longitudinally parallel to one another in a complete circle to position their ignition ends each pointing in a similar rearward direction and their opposite ends each pointing in a similar forward direction. The configuration of the flash lamps allows the multi-lamp flash wheel to be compactly fit into a camera.

DETAILED DESCRIPTION OF THE INVENTION

Figure 1:
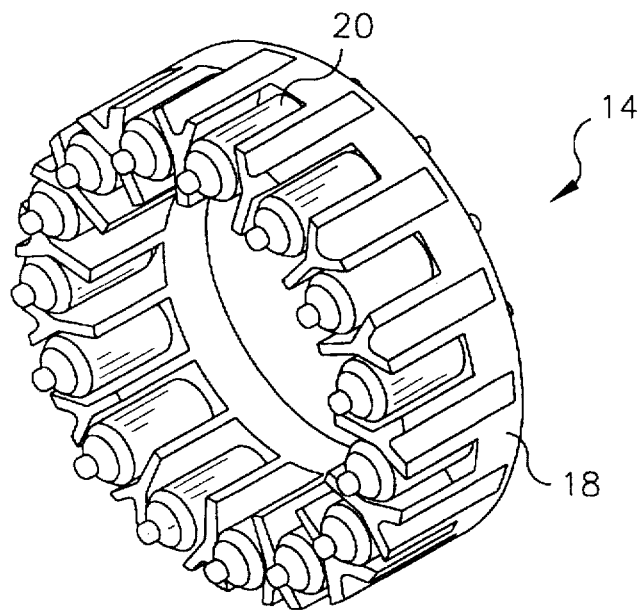
FIG. 1 is an assembled perspective view of a multi-lamp flash wheel pursuant to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 3–7 show a one-time-use camera 10 generally comprising a main body part 12 and a multi-lamp flash wheel 14 sandwiched between a front cover part 16 and a rear cover part (not shown). The main body part 12 and the rear cover part fit together to form a lighttight film casing.

Figure 2:
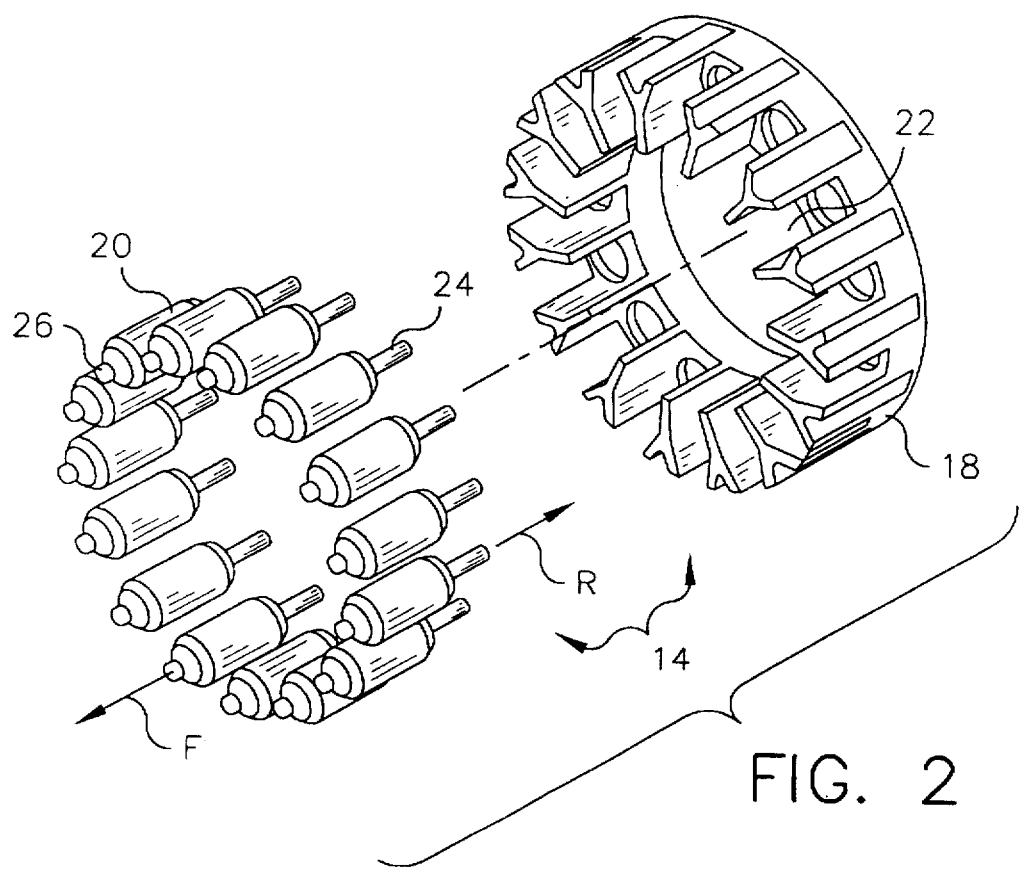
FIG. 2 is an exploded perspective view of the multi-lamp flash wheel.

The multi-lamp flash wheel 14, as shown in FIGS. 1 and 2, includes a lamp-holding wheel 18 and a circular array of fifteen identical known-type flash lamps 20 secured in separate flash reflector pods 22 of the lamp-holding wheel. The flash lamps 20 have respective ignition (inner) ends 24 and respective opposite light-emitting ends 26, and are located longitudinally parallel to one another in a complete circle to position their ignition ends each pointing in a similar rearward direction R and their opposite ends each pointing in a similar forward direction F. See FIG. 2.

The main body part 12, as shown in FIGS. 3–7, includes a film chamber 28 for housing an unexposed film roll (not shown) and a film chamber 30 for housing a film cartridge (not shown). A thumbwheel 34 coaxially connected to a film spool inside the film cartridge is manually rotated to wind successive exposed frames of a filmstrip (not shown) into the film cartridge following each film exposure at the rear of an exposure chamber 32 between the film chambers 28 and 30. A taking lens 36 is mounted over a shuttered front aperture 38 to the exposure chamber 32 and protrudes forward of the main body part 12. See FIG. 7.

The front cover 16 has a top opening 40 for a shutter release button 42 which when manually depressed initiates picture-taking, a lens opening 44 for the taking lens 36, and a front viewfinder window 46 aligned with a connected pair of front and rear viewfinder lenses 48 and 50 fitted to the main body part 12. See FIG. 7. A flash dispersing prism or lens 52 is located in a flash emission window 54 in the front cover 16.

Figure 4:
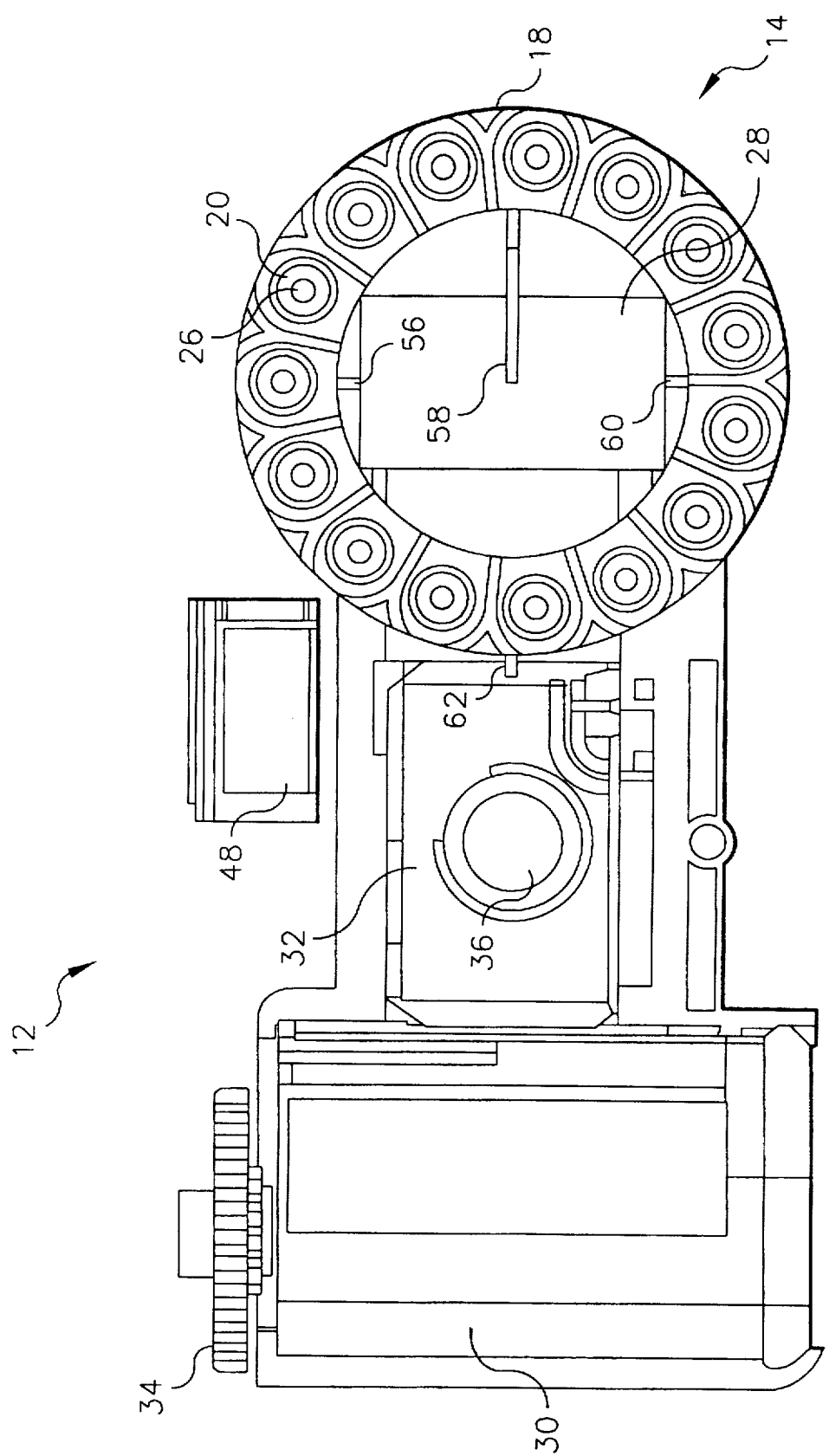
FIG. 4 is a front plan view of the main body part and the multi-lamp flash wheel.
Figure 5:
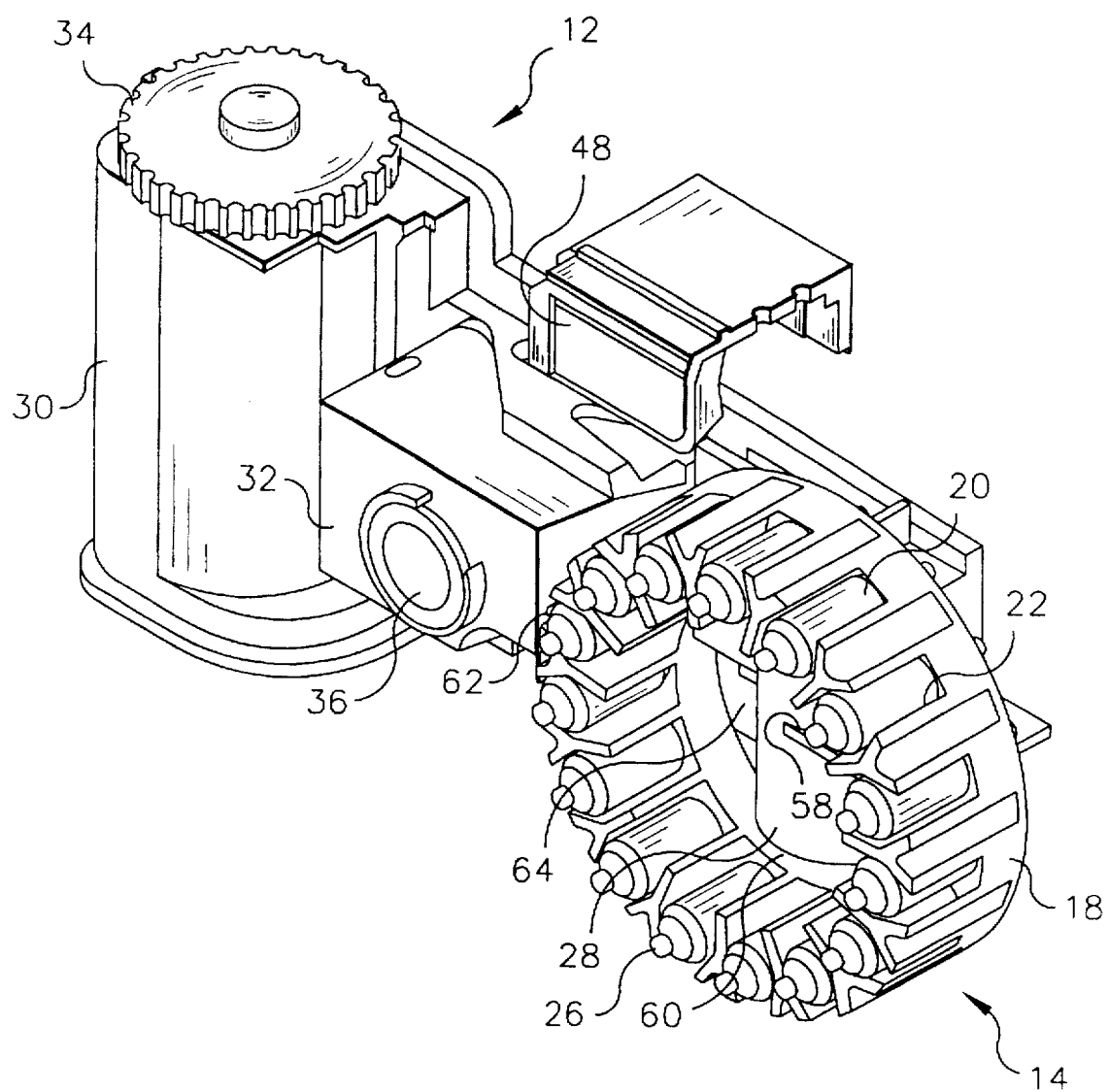
FIG. 5 is a front perspective view of the main body part and the multi-lamp flash wheel.
Figure 6:
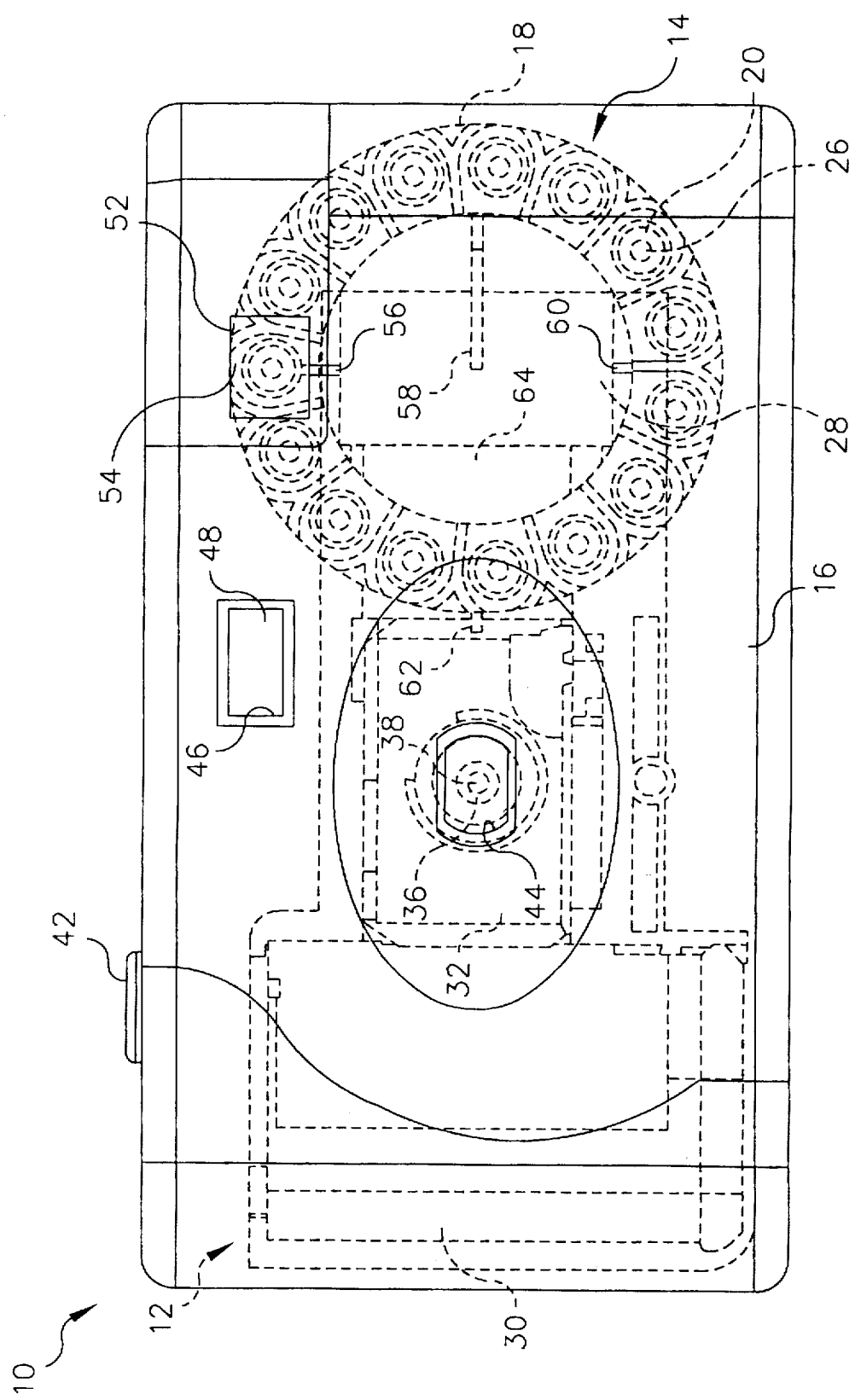
FIG. 6 is a front plan view similar to FIG. 4 but including a front cover part of the camera.
Figure 7:
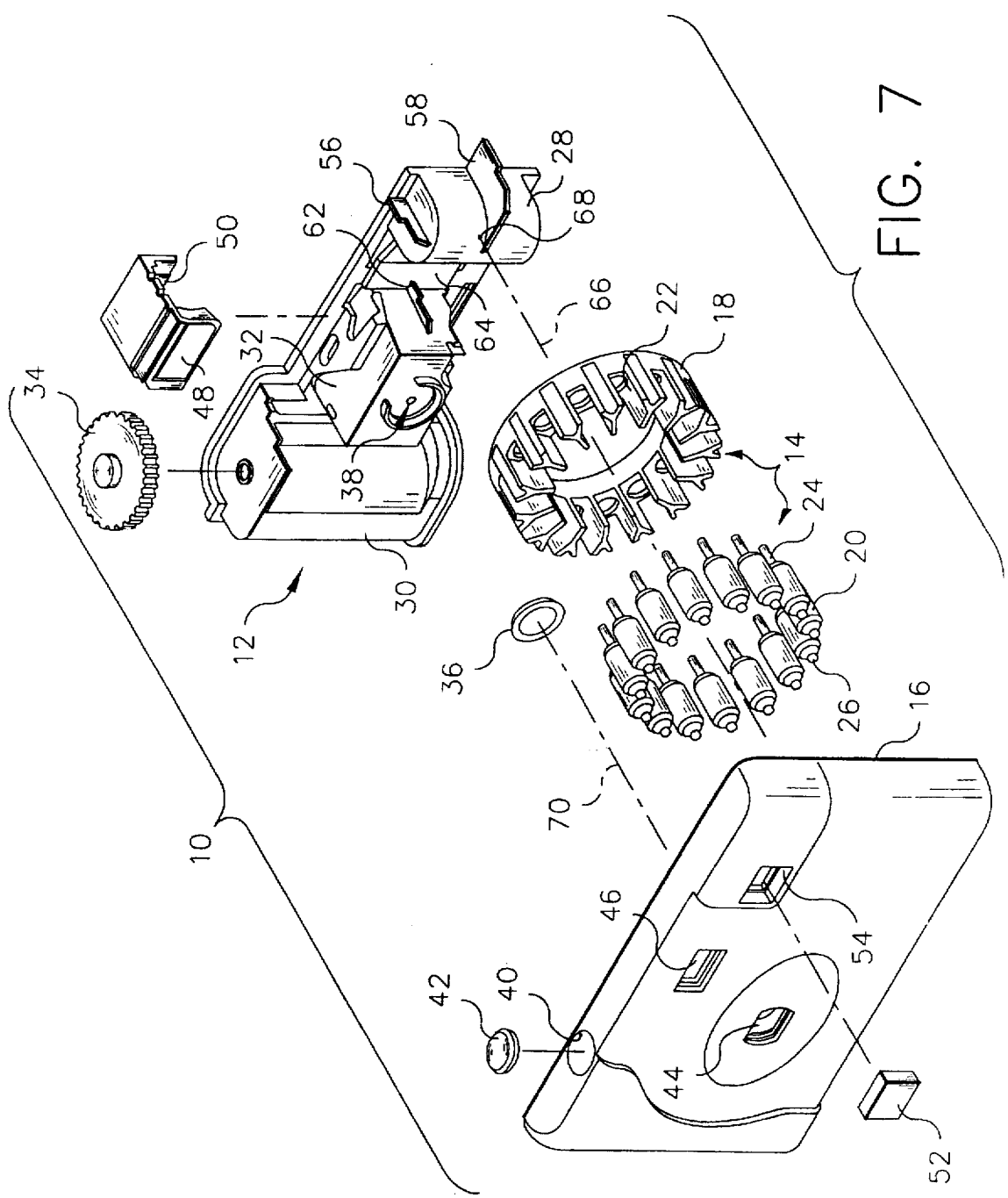
FIG. 7 is an exploded perspective view of the front cover and main body parts of the camera and the multi-lamp flash wheel.

As shown in FIGS. 4 and 7, four evenly spaced supports 56, 58, 60 and 62 on the main body part 12 support the multi-lamp flash wheel 14 for rotation about the film chamber 28, including through a gap 64 which extends widthwise between that chamber and the exposure chamber 32. The multi-lamp flash wheel 14 is rotatable about a center axis 66 that coincides with a centerpoint 68 of the film chamber 28 and extends parallel to an optical axis 70 of the taking lens 36, to move the successive lamps 20 from respective storage positions behind the front cover part 16 to a use position behind the flash emission window, to illuminate a subject to be photographed. The individual lamps 20 are located longitudinally parallel to the center axis 66 as shown in FIG. 7.

Figure 3:
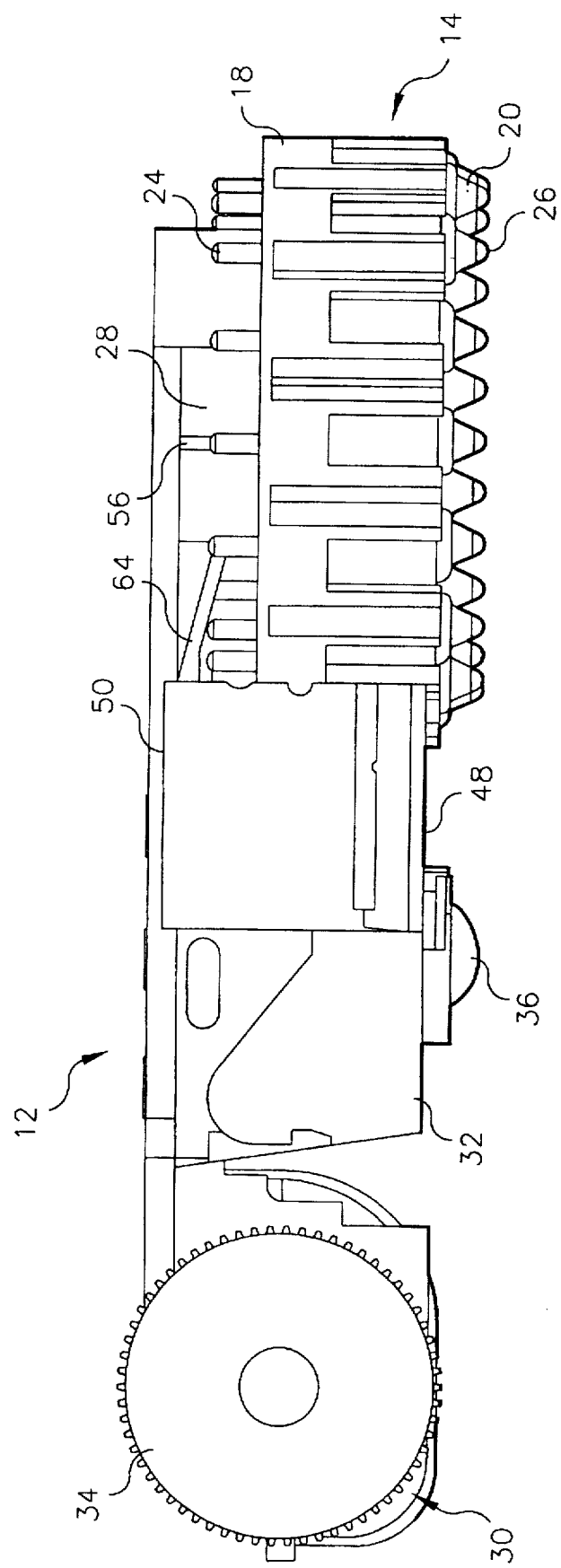
FIG. 3 is a top plan view of a main body part of a camera including the multi-lamp flash wheel, pursuant to a preferred embodiment of the invention.

As shown in FIG. 3, the flash lamps 20 simultaneously protrude forward of the main body part 12 no farther than the taking lens 36 protrudes forward of the main body part.

The invention has been described with reference to a preferred embodiment. However, it will be appreciated that variations and modifications can be effected by a person of ordinary skill in the art without departing from the scope of the invention.

Parts list 10. one-time-use camera
12. main body part
14. multi-lamp flash wheel
16. front cover part
18. lamp-holding wheel
20. flash lamps
22. flash reflector pods
24. lamp ignition ends
26. lamp opposite ends r. rearward direction f. forward direction
28. film chamber
30. film chamber
32. exposure chamber
34. thumbwheel
36. taking lens
38. aperture
40. top opening
42. shutter release button
44. lens opening
46. front viewfinder window
48. front viewfinder lens
50. rear viewfinder lens
52. flash prism
54. flash emission window
56. wheel support
58. wheel support
60. wheel support
62. wheel support
64. gap
66. center axis
68. centerpoint
70. optical axis

We claim:

1. A camera comprising a main body part having a film chamber, and a support for supporting a multi-lamp flash wheel for rotation to move successive flash lamps from a storage to a use position for illuminating a subject to be photographed, is characterized in that:

said support supports the multi-lamp flash wheel for rotation around said film chamber to make said camera relatively compact.

2. A camera as recited in claim 1, wherein a taking lens is secured to said main body part and protrudes forward of the main body part, and said support supports the multi-lamp flash wheel to locate its flash lamps to simultaneously protrude forward of said main body part no farther than said taking lens protrudes forward of the main body part.

3. A camera as recited in claim 2, wherein said taking lens has an optical axis, and said support supports the multi-lamp flash wheel for rotation about a center axis extending parallel to the optical axis and to locate the flash lamps longitudinally parallel to the center axis.

4. A camera as recited in claim 1, wherein said film chamber is configured to hold an unexposed film roll.

5. A camera comprising a main body part having an exposure chamber and a film chamber, and means for supporting a multi-lamp flash wheel for rotation to move successive flash lamps from a storage to a use position for illuminating a subject to be photographed, is characterized in that:

a gap extends widthwise between said exposure chamber and said film chamber which is sufficient in width to allow the multi-lamp flash wheel to be rotated through said gap; and said means supports the multi-lamp flash wheel for rotation about said film chamber, including through said gap, to make said camera relatively compact.

6. A camera as recited in claim 5, wherein said means supports the multi-lamp flash wheel for rotation about a center axis that coincides with a centerpoint of said film chamber.

7. A camera comprising a main body part having a film chamber, a multi-lamp flash wheel with a circular array of flash lamps having respective ignition ends and respective opposite ends, and means for supporting said multi-lamp flash wheel for rotation to move its successive lamps from a storage to a use position for illuminating a subject to be photographed, is characterized in that:

said means supports said multi-lamp flash wheel for rotation about said film chamber and to locate said flash lamps longitudinally parallel to one another to position their ignition ends each pointing in a similar rearward direction and their opposite ends each pointing in a similar forward direction, to make said camera relatively compact.

* * * * *